Oct. 25, 1955  J. A. BOMBARDIER  2,721,485
SPROCKET WHEEL
Filed April 22, 1953
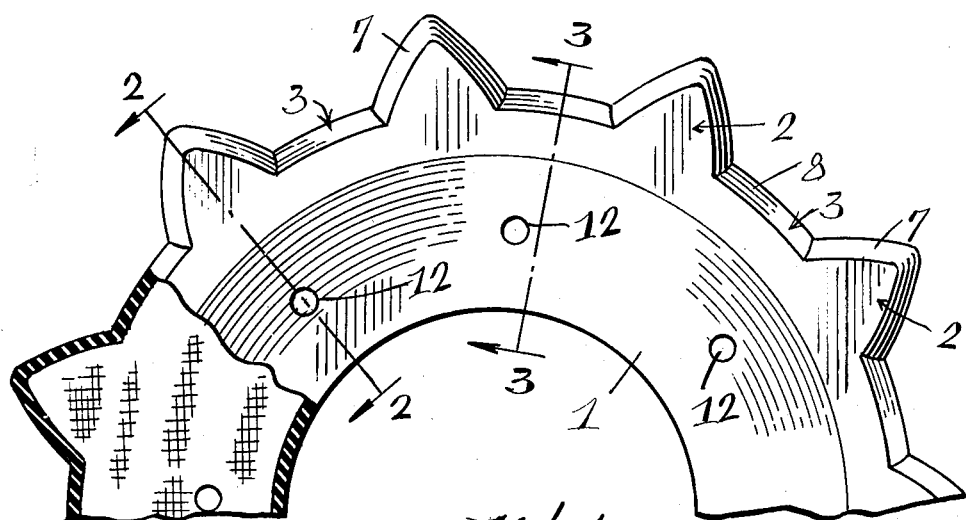
Fig. 1
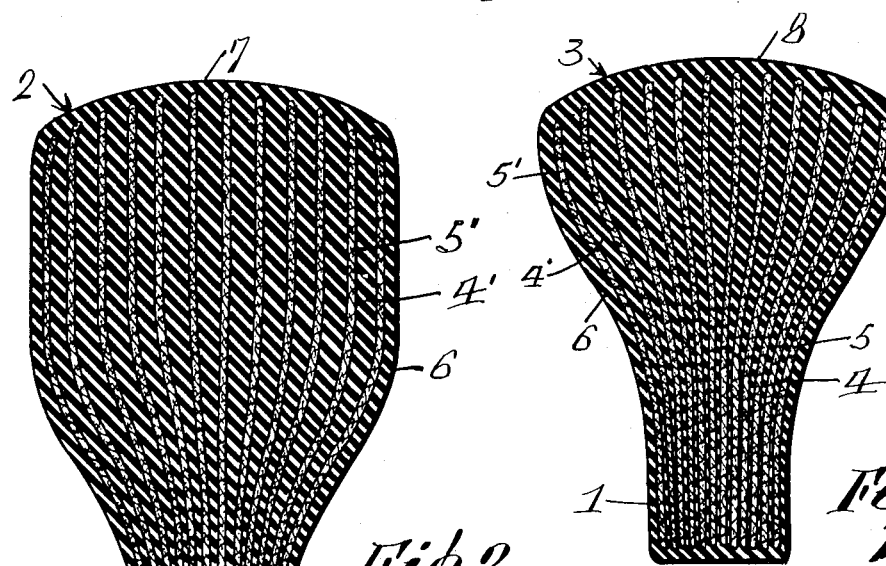
Fig. 2
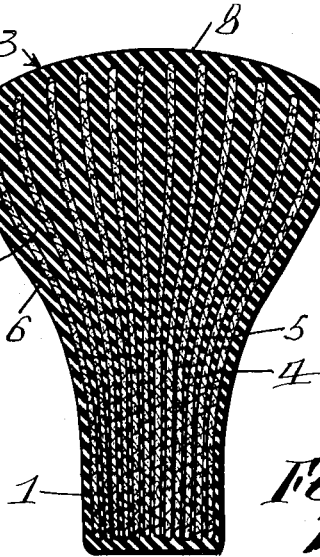
Fig. 3
Inventor:
Joseph Armand Bombardier
By 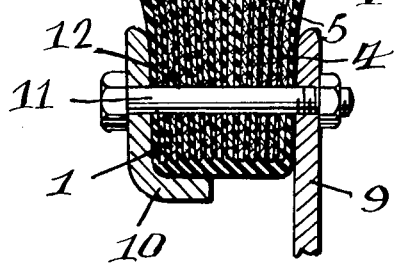
Attorney

United States Patent Office 2,721,485
Patented Oct. 25, 1955

2,721,485

SPROCKET WHEEL

Joseph Armand Bombardier, Valcourt, Quebec, Canada

Application April 22, 1953, Serial No. 350,426

2 Claims. (Cl. 74—243)

The present invention pertains to a novel sprocket wheel for driving the track of a belt-traction machine and constitutes improvements on the device shown in my U. S. Patent No. 2,374,644, of May 1, 1945.

Track-propelled vehicles are often used on snow, under which the ground is hidden, or on rough terrain as in military operations. Under such hard driving conditions, the sprocket wheels are often broken, especially at the teeth, by impact with hard protruding objects.

The principal object of the invention is to eliminate such breakage and is accomplished by rendering the wheel flexible or pliable when striking obstacles, namely at the teeth and at the troughs between the teeth. A further object is to provide a simple and durable construction for this purpose.

In the accomplishment of these objects, the device of the invention comprises a rim with spaced sprocket teeth thereon. The rim is ultimately mounted on a suitable wheel body or hub. The wheel and teeth are composed of continuous, alternating layers of fabric and resilient material, secured together as in a molding process, and lying parallel to the plane of the wheel. At the inner circumference of the rim, the layers are relatively thin and closely packed to form a rigid body. As the layers extend outward into the teeth and toward the troughs between the teeth, the resilient layers become thicker and thus flare outward. The thicker portions form a relatively pliable body that resists shock without breakage, for the purpose set forth above. The flare is symmetrical to a central plane, so that the wheel may be used on either side of the vehicle.

The invention is fully disclosed by way of example in the following description and in the accompanying drawings in which:

Figure 1 is a side elevation of the device, partly in section;

Figure 2 is a section on the line 2—2 of Figure 1; and

Figure 3 is a section on the line 3—3 of Figure 1.

Reference to these views will now be made by use of like characters which are employed to designate corresponding parts throughout.

In Figure 1 is shown a sprocket or similar wheel comprising a rim 1 on which are formed sprocket teeth 2. The spaces between adjacent teeth are designated as troughs 3. The rim is adapted to be mounted on a suitable wheel body or hub.

The wheel, including rim and teeth, is made up of alternating layers of rubber 4 and layers of fabric 5. The resilient layers become thicker at the outer edge of the rim and the body of the teeth, as well as at the troughs 3, as indicated by the numerals 4' and 5'. Consequently, the wheel flares outward from the inner part, since the layers are substantially parallel to the plane of the wheel, where they maintain a constant thickness. The flare is symmetrical with respect to a central plane, so that the wheel may be used on either side of the vehicle.

The pack of layers is enclosed in a sheet rubber sheath 6 which constitutes the outer layers and is suitably secured to the circumferential edges of the layers 4 and 5. The track-engaging surfaces of the teeth and troughs are convex and the sheath 6 covers the outer edges of the fabric layers 5 as indicated by the numerals 7 and 8 respectively for better contact and for sealing the internal structure from particles and moisture.

The resilient or rubber layers are suitably joined or welded to the fabric layers preferably in a molding process. Where the layers are thicker, at the teeth and troughs, the wheel is more flexible than at the more compact portion of the rim 1. Thus, these parts yield under the impact of obstructions such as rocks and the like and do not break or chip, as do the more rigid constructions in present use. This property of the invention is especially valuable in the case of a track vehicle, used on covered or rough terrain.

At opposite surfaces of the wheel, at the inner circumference, are provided a hub plate 9 and an angle rim 10. These members and the wheel are apertured at 12 to receive fastening bolts 11.

Although a specific embodiment of the invention has been illustrated and described, it will be understood that various alterations in the details of construction may be made without departing from the scope of the invention as indicated by the appended claims.

What I claim is:

1. In a sprocket wheel having a rim and teeth on the outer circumference thereof, said rim comprising layers of resilient material and fabric secured together and lying substantially parallel to the plane of the wheel, said layers being extended outwardly to form the teeth and said layers of resilient material being thicker and more flexible at the teeth of the wheel than at the inner portion, whereby the wheel flares outward from the inner portion along the sides of the teeth, the flaring being symmetrical with respect to a central plane.

2. In a sprocket wheel having a rim and teeth on the outer circumference thereof, said rim comprising layers of resilient material and fabric secured together and lying substantially parallel to the plane of the wheel, said layers being extended outwardly to form the teeth and said layers of resilient material being thicker and more flexible at the teeth of the wheel than at the inner portion, whereby the wheel flares outward from the inner portion along the sides of the teeth, the flaring being symmetrical with respect to a central plane, and a sheath of resilient material enclosing said layers and forming a continuous surface traversing the outer edges of said layers.

References Cited in the file of this patent

UNITED STATES PATENTS

| | | |
|---|---|---|
| 1,126,648 | Marble | Jan. 26, 1915 |
| 1,477,025 | Atwood | Dec. 11, 1923 |
| 1,870,801 | Engstrom | Aug. 9, 1932 |